US012793471B2

(12) United States Patent
Lemaire et al.

(10) Patent No.: US 12,793,471 B2
(45) Date of Patent: Nov. 10, 2026

(54) PROCESS AND SYSTEM FOR ESTIMATING THE REMAINING USEFUL LIFE OF TRANSPORT VEHICLE TIRES ON THE BASIS OF TELEMATIC DATA

(71) Applicant: COMPAGNIE GENERALE DES ETABLISSEMENTS MICHELIN, Clermont-Ferrand (FR)

(72) Inventors: Antoine Lemaire, Clermont-Ferrand (FR); Julia Coelho Santos, Clermont-Ferrand (FR); Claudia-Marcia Costa, Clermont-Ferrand (FR); Nelson Cruz, Clermont-Ferrand (FR); Francois Deheeger, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 62 days.

(21) Appl. No.: 18/852,185

(22) PCT Filed: Feb. 2, 2023

(86) PCT No.: PCT/EP2023/052526
§ 371 (c)(1),
(2) Date: Sep. 27, 2024

(87) PCT Pub. No.: WO2023/186371
PCT Pub. Date: Oct. 5, 2023

(65) Prior Publication Data

US 2025/0209859 A1 Jun. 26, 2025

(30) Foreign Application Priority Data

Mar. 29, 2022 (FR) ...................................... 2202803

(51) Int. Cl.
*B60C 11/24* (2006.01)
*G07C 5/00* (2006.01)
*G07C 5/08* (2006.01)

(52) U.S. Cl.
CPC ............ *G07C 5/006* (2013.01); *B60C 11/246* (2013.01); *G07C 5/008* (2013.01); *G07C 5/085* (2013.01)

(58) Field of Classification Search
CPC ...... B60C 11/246; G01M 17/02; G07C 5/006; G07C 5/008; G07C 5/085
See application file for complete search history.

(56) References Cited

U.S. PATENT DOCUMENTS 5,878,328 A 3/1999 Chawla et al.
9,878,721 B2 1/2018 Singh et al.
(Continued)

FOREIGN PATENT DOCUMENTS

WO 2020/205703 A1 10/2020

OTHER PUBLICATIONS

International Search Report dated Mar. 27, 2023, in corresponding PCT/EP2023/052526 (4 pages).
(Continued)

*Primary Examiner* — Ryan Rink
(74) *Attorney, Agent, or Firm* — VENABLE LLP

(57) ABSTRACT

An estimation method (200) implemented by a computer system (100) estimates a remaining useful life (RUL) of an identified tire by aggregating influential parameters obtained from the identified tire and telematics information obtained from an identified vehicle having the identified tire mounted thereon. A computer system (100) implements a method (200) for estimating the remaining useful life (RUL) of an identified tire by aggregating influential parameters obtained from the identified tire and telematics information obtained
(Continued)

from an identified vehicle having the identified tire mounted thereon.

19 Claims, 4 Drawing Sheets

(56) References Cited

U.S. PATENT DOCUMENTS

| | | | | |
|---|---|---|---|---|
| 10,936,917 | B2 | 3/2021 | Salti et al. | |
| 11,232,650 | B2 * | 1/2022 | Rajkumar | G01C 21/3461 |
| 11,458,776 | B2 | 10/2022 | Ciaravola et al. | |
| 11,993,260 | B2 | 5/2024 | Sams et al. | |
| 2017/0129498 | A1 | 5/2017 | Singh et al. | |
| 2020/0090419 | A1 * | 3/2020 | Rajkumar | G07C 5/006 |
| 2021/0188017 | A1 * | 6/2021 | Ciaravola | G01M 17/02 |
| 2021/0197625 | A1 * | 7/2021 | Laperle | G01M 17/013 |
| 2021/0245554 | A1 | 8/2021 | Ciaravola et al. | |
| 2022/0016938 | A1 | 1/2022 | Doraiswamy et al. | |
| 2022/0016940 | A1 | 1/2022 | Sams et al. | |
| 2022/0016941 | A1 | 1/2022 | Sams | |
| 2022/0017090 | A1 | 1/2022 | Sams et al. | |
| 2022/0219498 | A1 * | 7/2022 | Agarwal | B60C 23/0479 |
| 2024/0101053 | A1 * | 3/2024 | Story | G05B 23/00 |
| 2025/0100330 | A1 * | 3/2025 | Sworski | G01B 11/22 |

OTHER PUBLICATIONS

L. Breiman, “Random Forests”, Statistics Department, University of California, Berkeley (2001).

I. Mallouk, et al., “Machine learning approach for predictive maintenance of transport systems”, 2021 Third Int’l Conf. on Transportation and Smart Tech. (TST), pp. 96-100 (2021).

R. Prytz, et al., “Predicting the need for vehicle compressor repairs using maintenance records and logged vehicle data”, Engineering Applications of Artificial Intelligence 41 (2015) 139-150.

* cited by examiner

[Fig. 1]
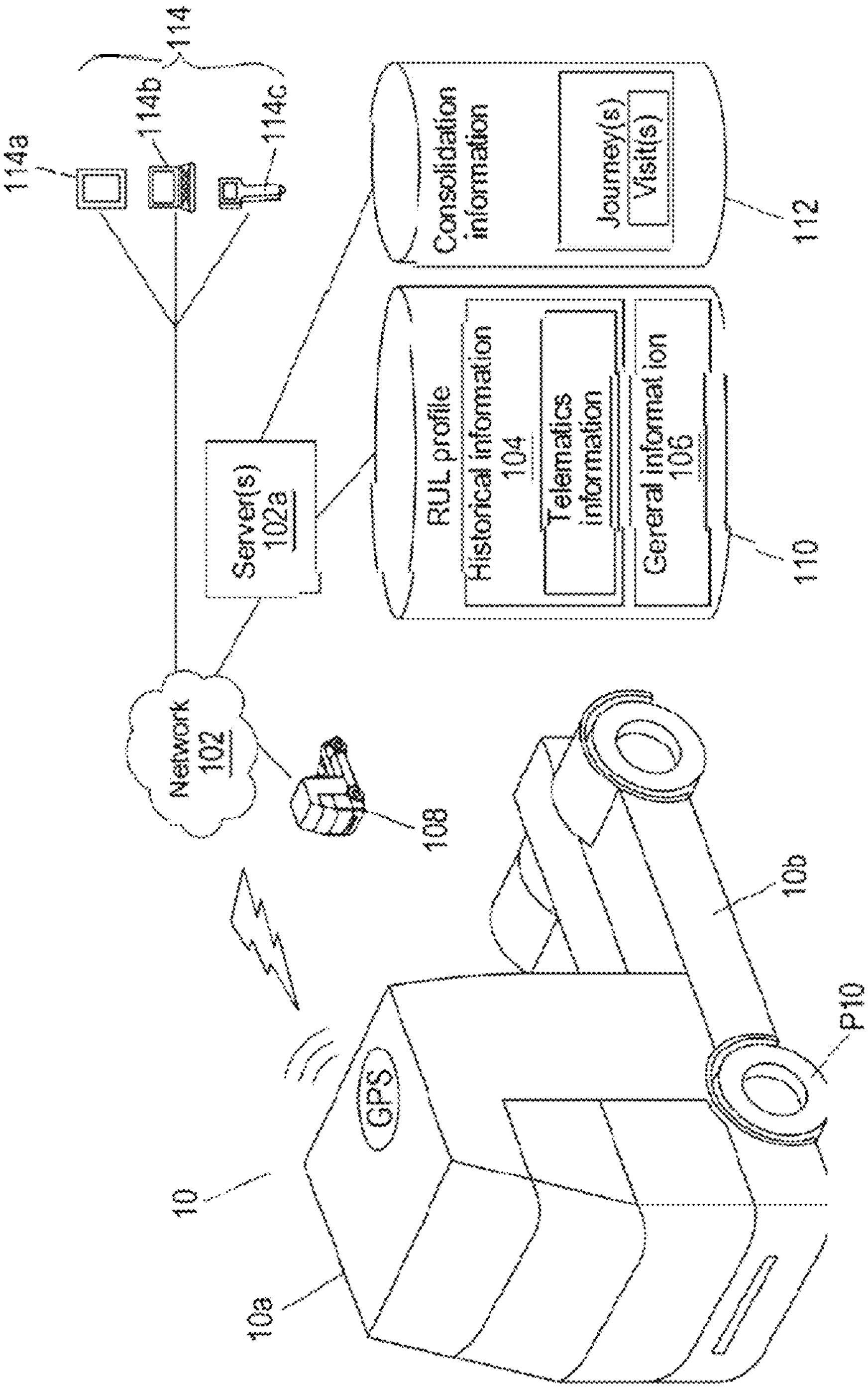

[Fig. 2]
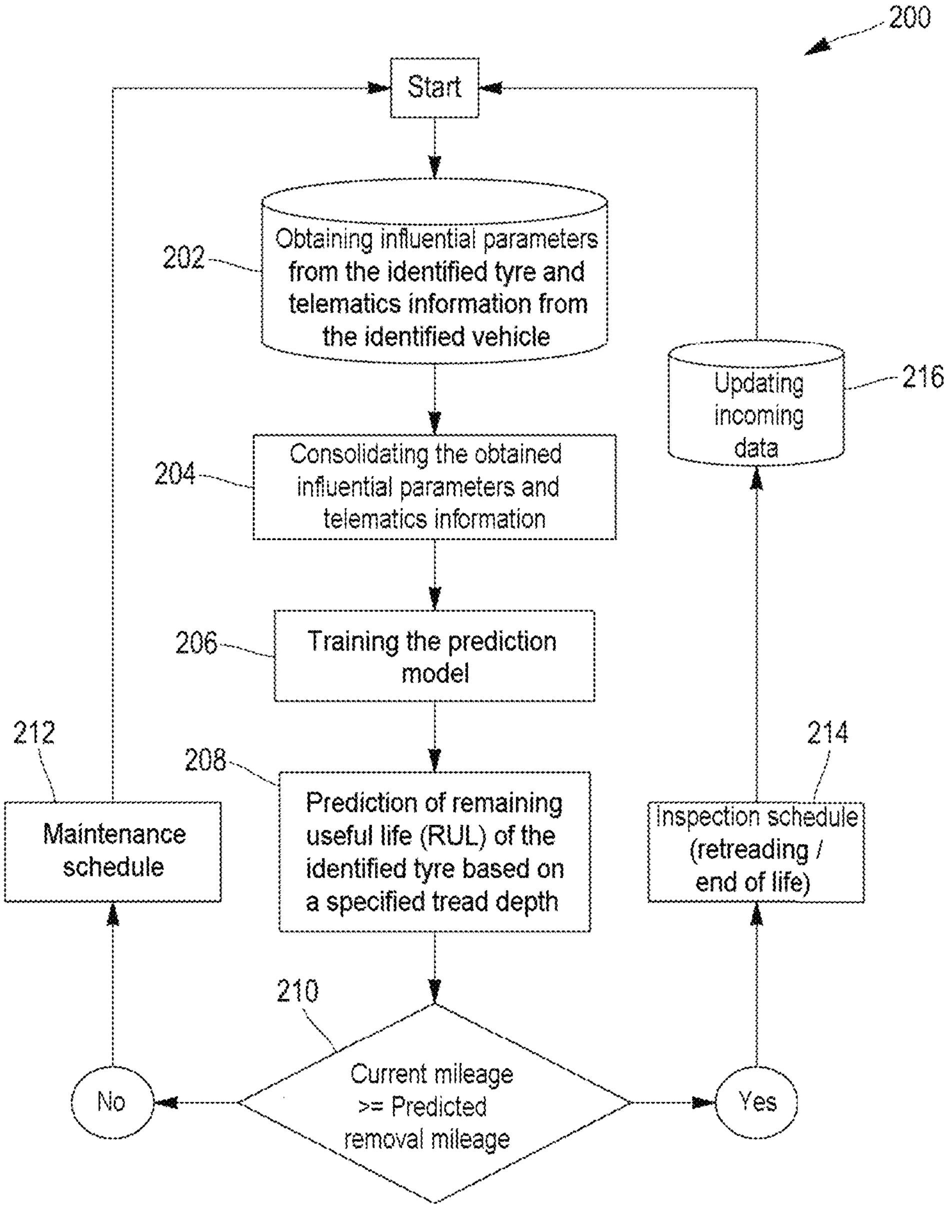

[Fig. 3]
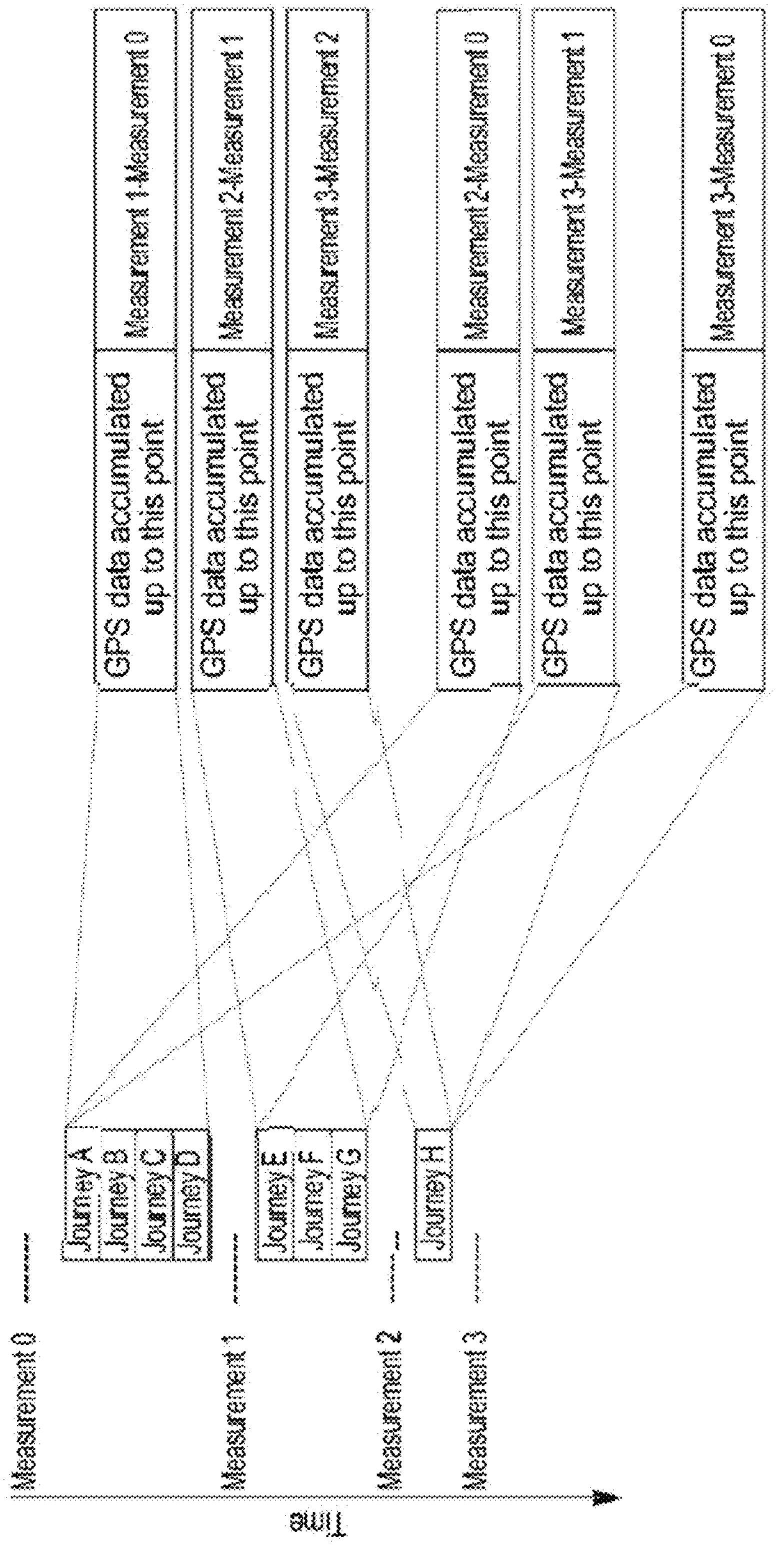

[Fig. 4]
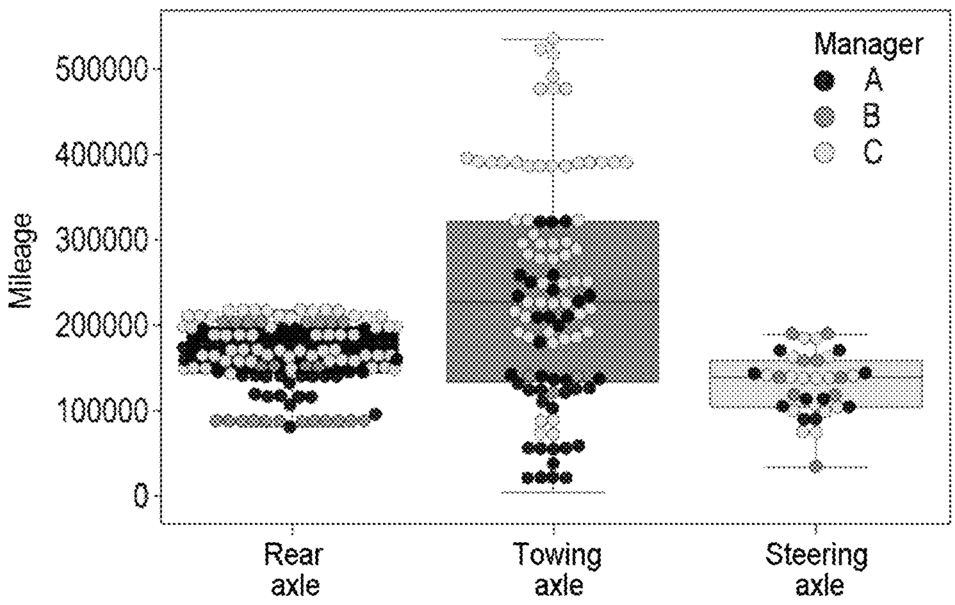

PROCESS AND SYSTEM FOR ESTIMATING THE REMAINING USEFUL LIFE OF TRANSPORT VEHICLE TIRES ON THE BASIS OF TELEMATIC DATA

TECHNICAL FIELD

The invention relates to a method implemented by a computer system for estimating a remaining useful life (RUL) of an identified tire by aggregating influential parameters obtained from the identified tire and telematics data obtained from an identified vehicle on which the identified tire is mounted. The invention also relates to a computer system for implementing a method for estimating the remaining useful life (RUL) of an identified tire by aggregating influential parameters obtained from the identified tire and telematics data obtained from an identified vehicle having the identified tire mounted thereon.

BACKGROUND

In the transport sector, manufacturers and/or managers of transport vehicles generally design maintenance plans based on parameters such as calendar time and/or mileage. These transport vehicles (or "vehicles") can include trucks, light commercial vehicles (or "LCVs"), buses, vans, cars (e.g., cabs), military vehicles and other types of ground transportation that make several trips a day between two or more predetermined locations. These vehicles are configured to perform operations related to various industries, such as transportation, mining, forestry, waste management, construction, quarrying, logistics and agriculture. They are also configured for government and military operations.

Transport vehicles encounter multiple driving conditions, including variable road and environmental conditions. Road conditions can include, for example, slopes/declines, curves and road quality, such as potholes, etc. The environmental conditions can include, for example, traffic jams, road construction and meteorological phenomena, such as precipitation and temperature. Consequently, transport fleet managers must manage downtime and the associated transport costs. As used herein, the term "fleet" refers to one or more transport vehicles, where a fleet can refer to the set of vehicles located or based at a given location, located or based at equivalent locations, used for a similar purpose and/or used by an identified entity (for example, a company, a military unit, etc.).

Tires constitute a significant contribution to transportation costs. Thus, it may be necessary to monitor the operations of one or more transport vehicles in order to determine the overall efficiency of their operation. In particular, tire management can have dramatic consequences in the event of a failure. However, transport vehicle managers lack this information for the tires when the vehicles are far from a base where the vehicles are managed. For example, there is no warning to indicate the need for immediate maintenance or visibility of the current state of a fully running tire (either in a loaded state or in an empty state).

One known solution for addressing this challenge is the use of telematics. On the basis of operational information or data, it is possible to predict how and/or where a truck can be used. The data that can be monitored and stored includes, without limitation, the miles actually travelled, the type of road surface, the use of the vehicle by the user, the time of day when the vehicle is driven, the acceleration/deceleration rate, the braking rate, the state of the road, lateral acceleration or other features indicating tight turning maneuvers, driver identification, and temporal characteristics (for example, period of inactivity). The telematics data can be generated by mobile applications, sensors installed on the vehicles, data originating from one or more communication networks (or "Controller Area Networks" or "CANs"), on-board diagnostic devices (or "OBDs") and their combinations and their equivalents.

This data can be used for predictive maintenance, which designates maintenance actions based on the "health" of a tire and its environment. Relevant information (for example, tire wear) can be estimated by applying artificial intelligence (AI) techniques. A machine learning (or "ML") approach can be used to establish a prediction model based on supervised learning (including semi-supervised learning), with this model then being applied to estimating the remaining useful mileage of the tires of transport vehicles for a transport application. The ML methods can be used to describe the current state of a system, predict the future state and values of the system and/or recommend actions to maintain or improve system functionality based on the basis of data-driven models, with these models being generated from a data set consisting of historical data records. This historical data is used as a reference for validating the model performance. The choice of prediction algorithms is based on the availability of this data and the requirements of the stakeholders (including, without limitation, the driver, the fleet manager and the maintenance manager) (see "*Machine Learning Approach for Predictive Maintenance of Transport Systems*", Mallouk, Issam et al., 2021, *Third International Conference on Transportation and Smart Technologies*, DOI: 10.1109/TST52996.2021.00023 (2021) (or "Issam reference"). Thus, in a sense, prediction of future maintenance needs can be performed by monitoring equipment and detecting patterns that signal an emerging failure.

In particular, "Set Learning" concerns a general approach to machine learning that aims to improve predictive performance by combining the predictions of several models. There are three main classes of Set Learning methods (but it is understood that an unlimited number of ensembles could be developed for predictive modelling).

Bootstrap aggregation (or "bagging") involves fitting several decision trees to various samples of the same set of data and averaging the predictions. The main idea behind bagging is to generate a series of independent observations with the same size and distribution as those of the original data. Given the series of observations, a set predictor is generated that is better than the single predictor generated from the original data. Several algorithms exist that are based on the bagging technique, including, without limitation, Bagged Decision Tree and Random Forest methods. The "Random Forest" method uses the bagging method to improve the predictions of the basic classifier (which is a decision tree).

"Boosting" involves sequentially adding set members that correct the predictions made by the preceding models and producing a weighted average of the predictions. The Boosting technique is used to convert a weak learning model into a learning model with better generalization. For example, techniques such as the majority vote technique (in the case of classification problems) or a linear combination of weak learners (in the case of regression problems) are used to obtain a better prediction. Several algorithms exist that are based on the Boosting technique, including, without limitation, the AdaBoost and Gradient Boosting methods.

"Stacking" relates to the adjustment of several different types of models on the same data and using another model to learn how to best combine the predictions. Stacking can be achieved either by combining the outputs of several basic models, or by using a method for selecting the "best" basic model. Stacking is one of the integration techniques in which the meta-learning model is used to integrate the output of the base models. Several algorithms exist that are based on the Stacking technique, including, without limitation, the Blending and Stacked Models methods. Applying Set Learning techniques in the transport field is acknowledged in the prior art. For example, U.S. Pat. No. 10,936,917 discloses a system that implements a machine learning algorithm to identify and classify the recurrent stoppages of a fleet of vehicles. The algorithm is capable of selecting a subset of features for identification and classification. The classification implements a Random Forest type algorithm to classify a recurrent stoppage in a warehouse, an employee home, or other locations.

In another example, U.S. Pat. No. 5,878,328 discloses a process for building a classification model using the driving habits of identified drivers for whom the driver signature model is to be developed. During the method, telematics data is generated, and, based on the consolidation of telematics data gathered from various sources, a system analytics platform quantifies each driver's risk factor in terms of the way they drive the vehicle. A Random Forest technique is used to distinguish a non-linear boundary between the drivers driving models so that the model can learn the predominant way the driver drives the vehicle.

However, models can search for parameter changes related to actual component degradation, or they can examine vehicle usage patterns and indirectly infer component wear. Data-driven solutions can be based on real-time data transmitted during operation or on gathered historical data (see "*Predicting the Need for Vehicle Compressor Repairs Using Maintenance Records and Logged Vehicle Data*", Prytz R. et al., Engineering Applications of Artificial Intelligence 41 (2015), 139-150) ("Prytz reference"). Future maintenance requirements therefore can be predicted by predicting a remaining useful life (RUL).

Transport vehicles (including heavy vehicles) operate in various and often harsh environments. The possibilities for continuous monitoring are therefore limited. Thus, the disclosed invention estimates the remaining useful life (RUL) of an identified tire that is mounted on an identified vehicle (for example, an identified transport truck). Estimating the remaining useful life involves a means for estimating a tire's remaining mileage in a transport environment. This estimation is based on a machine learning algorithm that fed solely by the telematics information: no tread depth measurement is required. The mileage estimate is therefore used to provide usable recommendations concerning the tire's condition, including its removal date.

SUMMARY OF THE INVENTION

The invention relates to an estimation method implemented by a computer system for estimating a remaining useful life of an identified tire by aggregating influential parameters obtained from the identified tire and telematics information obtained from an identified vehicle having the identified tire mounted thereon, characterized in that the method includes the following steps:

- a step of performing a process of building a prediction model, including the following steps:
- a step of introducing, to the system; influential parameters of the identified tire including data obtained by one or more communication devices of the system and transmitted to a server of the system and including telematics information obtained from the identified vehicle; and
- a step of consolidating, by one or more processors of the system, the obtained influential parameters and the obtained telematics information in order to compile a plurality of independent journeys for developing at least one remaining useful life profile of the identified tire;
- a step of training the prediction model that uses a consolidated output to establish a plurality of predictions corresponding to journeys made by the identified vehicle having the identified tire mounted thereon and to estimate the number of journeys to be made by this identified tire, wherein a supervised learning model is used to predict the remaining useful life corresponding to a predicted mileage for removing the identified tire;
- a step of predicting, by the one or more processors, the number of journeys taken in real time, wherein the predicting includes predicting a type of journey based on the telematics information including historical geographical coordinates; and
- a comparison step, during which the remaining useful life before reaching the predicted mileage for removing the identified tire, derived from the prediction model, is compared with a defined removal threshold value corresponding to a predicted mileage for removing the identified tire, such that the system creates a maintenance plan for the identified tire.

In some embodiments of the method of the invention, the method further includes a step of storing the influential parameters of the identified tire and the telematics information in a database of the system, wherein the influential parameters of the identified tire include:

- the historical information of the identified tire including data corresponding to the historical journeys of the identified vehicle having the identified tire mounted thereon; and
- general information of the identified tire including data corresponding to the identified tire, including its mounting position on the identified vehicle.

In some embodiments of the method of the invention, the maintenance plan created by the system during the comparison step includes:

- a maintenance schedule, in which the identified tire remains mounted on the identified vehicle, where the number of miles derived from the prediction model is greater than the defined removal threshold value for the identified tire; and
- an inspection schedule, in which the identified tire is inspected, where the number of miles derived from the prediction model is equal to or less than the defined removal threshold value for the identified tire.

In some embodiments of the method of the invention, the entering step further includes a step of entering the telematics data originating from one or more communication networks into the system.

In some embodiments of the method of the invention, the entering step further includes a step of entering into the system the telematics data originating from a location means of the system mounted on or in the identified vehicle, this entering step including:

- entering telematics information into the system that corresponds to each visit of the identified vehicle to a scheduled location; and entering the data obtained by the location means into the system that corresponds to each journey of the identified vehicle.

In some embodiments of the method of the invention, the location means include one or more global positioning systems (GPS).

In some embodiments of the method of the invention, the method further includes a step of identifying a plurality of scheduled locations, wherein the identifying includes identifying coordinates of each scheduled location using historical GPS data obtained from the influential parameters incorporating the telematics information.

In some embodiments of the method of the invention, the identified vehicle includes a truck with a cab at the front and a chassis in the form of a flat body for connecting a transport container.

In some embodiments of the method of the invention, the historical information and/or the general information is generated and/or managed, at least partly, by one or more industrial vehicle managers, including one or more fleet companies to which the identified vehicle belongs and/or one or more producers, including mining producers.

In some embodiments of the method of the invention, the entering step includes a step of creating a reference database for the tires intended to be mounted on the identified vehicle.

In some embodiments of the method of the invention, the supervised learning model that is used to predict the remaining useful life during the training step includes a set learning method.

In some embodiments of the method of the invention, the set method includes using the Random Forest technique in order to distinguish a non-linear boundary between the maximum mileages of the various tires.

The invention also relates to a computer system for implementing a method for estimating the remaining useful life of an identified tire by aggregating influential parameters obtained from the identified tire and telematics information obtained from an identified vehicle having the identified tire mounted thereon, characterized in that the system includes:

at least one memory configured to store a data analysis application representative of a consolidation of a plurality of telematics data and influential parameters in order to compile a plurality of independent journeys for establishing at least one remaining useful life profile of the identified tire; and one or more communication servers, each including at least one or more processors operationally connected to the memory, with the one or more processors including a module for running the analysis application that consolidates the influential parameters and the telematics information, wherein the one or more processors is/are capable of running programmed instructions stored in the memory in order to:

perform a process of building a prediction model, including the following steps:

a step of entering influential parameters of the identified tire into the system including data obtained by one or more communication devices of the system and transmitted to a server of the system and including telematics information obtained from the identified vehicle; and a step of consolidating, by one or more processors of the system, the obtained influential parameters and the obtained telematics information in order to compile a plurality of independent journeys in order to establish at least one remaining useful life profile of the identified tire;

training the prediction model that uses a consolidated output to establish a plurality of predictions corresponding to journeys made by the identified vehicle having the identified tire mounted thereon and to estimate the number of journeys to be made by this identified tire, wherein a supervised learning model is used to predict the remaining useful life corresponding to a predicted mileage for removing the identified tire;

predicting, by the one or more processors, the number of journeys taken in real time, wherein the predicting includes predicting a type of journey based on the telematics information including historical geographical coordinates; and undertaking a comparison, during which the remaining useful life before reaching the predicted mileage for removing the identified tire, derived from the prediction model, is compared with a defined removal threshold value corresponding to a predicted mileage for removing the identified tire, such that the system creates a maintenance plan for the identified tire.

In some embodiments of the system of the invention, the system further includes:

a communication network that manages the data entering the system, the communication network including:

at least one communication server with at least one processor that manages the data corresponding to the influential parameters of the identified tire; and one or more communication devices that obtain the data corresponding to the influential parameters of the identified tire and transmits them to the server;

a database that stores the influential parameters of the identified tire, with these data including the telematics information corresponding to each visit of the identified vehicle to a scheduled location; and a database storing data that is consolidated in order to construct at least one remaining useful life profile (RUL) of the identified tire from a plurality of journeys made by the identified vehicle mounted with the identified tire.

In some embodiments of the system of the invention, the data stored in the database includes data obtained from a location means mounted on or in the identified vehicle, with the data including:

telematics information that corresponds to each visit of the identified vehicle to a scheduled location; and data obtained by the global positioning system that corresponds to each journey of the identified vehicle.

In some embodiments of the system of the invention, the server is associated with one or more vehicle transport managers.

In some embodiments of the system of the invention, the influential parameters of the identified tire include:

the historical information of the identified tire including data corresponding to the historical journeys of the identified vehicle having the identified tire mounted thereon; and the general information of the identified tire, including its mounting position on the identified vehicle.

In some embodiments of the system of the invention, the supervised learning model that is used to predict the remaining useful life when training the prediction model includes a set learning method.

In some embodiments of the system of the invention, the set learning method includes using the Random Forest technique to distinguish a non-linear boundary between the maximum mileages of the various tires.

Further aspects of the invention will become apparent from the following detailed description.

BRIEF DESCRIPTION OF THE DRAWINGS

The nature and various advantages of the invention will become more apparent from reading the following detailed description, in conjunction with the attached drawings, in which the same reference numbers designate identical parts throughout, and in which:

FIG. 1 shows a schematic view of an embodiment of a system of the invention that implements a method for estimating a remaining useful life of an identified tire.

FIG. 2 shows a flow diagram of an embodiment of an estimation method of the invention performed by the system of FIG. 1.

FIG. 3 shows an exemplary consolidation of accumulated data at a predicted point representing several journeys made by an identified tire between consecutive visits.

FIG. 4 shows an exemplary analysis of total mileage data of removed tires that is used to train an algorithm based on the Ensemble Learning technique.

DETAILED DESCRIPTION

The solution proposed by the invention aims to estimate the remaining useful life (RUL) of an identified tire mounted on an associated transport vehicle (or "vehicle"). This estimation is performed using only historical information of the journeys made by the vehicle (including, for example, the cases where the vehicle includes a truck or a bus, data corresponding to the data obtained by means of a global positioning system (GPS) (or "GPS system")) that the concerned tire has made, as well as general information relating to this tire (including, for example, data corresponding to its retread rank, its mounting position on the vehicle, the theoretical average number of journeys at this position and the performance of similar tires). This data, containing an important part of the identified tire's usage, will be used in a machine learning model to predict the remaining mileage of the identified tire, based on the parameters influencing its service life.

The makeup of a tire is typically described by representing its constituent components in a meridian plane, i.e., a plane containing the axis of rotation of the tire. The radial, axial and circumferential directions respectively denote the directions perpendicular to the axis of rotation of the tire, parallel to the axis of rotation of the tire, and perpendicular to any meridian plane. The expressions "radially", "axially" and "circumferentially" mean "in a radial direction", "in the axial direction" and "in a circumferential direction" of the tire, respectively. The expressions "radially interior" and "respectively radially exterior" mean "closer to, respectively further away from, the axis of rotation of the tire, in a radial direction".

Referring now to the figures, in which the same numbers identify identical elements, FIG. 1 shows an embodiment of a computer system (or "system") 100 for implementing a method 200 for estimating remaining useful life RUL (or "method for estimating RUL" or "method") of the invention (see FIG. 2). The method 200 for estimating RUL of the invention benefits from the methods and tools that are based on artificial intelligence (or "AI") in order to associate an RUL prediction with each identified tire that is obtained from the data recorded during the cycles of journeys made by the associated vehicle. Thus, the system 100 allows continuous improvement over all the tires mounted on a fleet of vehicles, ensuring that the system 100 improves due to the experience that it acquires from each tire and from each associated vehicle.

The estimation method 200 is based on the use of an identified tire, being defined via a remaining useful life (RUL) profile of the identified tire derived from a prediction model based on a machine learning model. It is understood that its state of use and its corresponding mileage are represented by a set of values. These values represent the difference that exists between the new state (represented by a tire that has never been mounted on the identified vehicle) and the worn state (represented by a tire that has been withdrawn from use since it has reached the removal threshold due to wear that corresponds to a scheduled mileage for removing the tire). The state of use can be in the form of a unit value such as the remaining mileage as a function of the tread height (without having to measure the tread depth).

As used herein, the "remaining useful life" (or "RUL") of an identified tire refers to its mileage potential as a function of the values of the parameters influencing its longevity. The remaining useful life can be determined continuously or at regular, predefined or sporadic intervals by gathering the data corresponding to the parameters influencing the lifetime of the identified tire. Based on the gathered data, the method 200 for estimating RUL of the invention can define a current state of use of the identified tire in order to determine its remaining useful life.

Referring again to FIG. 1, the system 100 includes a communication network 102 (or "network") that manages the data entering the system 100 from various sources. The communication network 102 incorporates at least one communication server 102*a* (or "server") with at least one processor that manages the data corresponding to the historical information 104 and to the general information 106 relating to an identified tire. The term "identified tire" (in the singular or plural) is used herein to refer to a particular tire present in the physical environment of the system 100 and that is mounted on an identified vehicle (namely, a tire still in use on the identified vehicle) (see, for example, the identified tire $P_{10}$ mounted on the transport truck 10 in FIG. 1).

The term "historical information" (in the singular or the plural) is used herein to refer to the data corresponding to the historical journeys of the identified vehicle having the identified tire mounted thereto. This data can include, without limitation, data corresponding to the schedules and/or the departure and/or arrival dates of the identified vehicle at a predetermined location (for example, a vehicle distribution base, a truck yard, a warehouse, etc.), the journeys made by the vehicle (this data is likely to be gathered from various sources, including data from the historical journeys assigned to a truck 10 and/or to one or more vehicles belonging to a fleet of transport vehicles) (see FIG. 1), data relating to the identified vehicle (including, without limitation, the manufacturer, the model of the identified vehicle and its version, its identification code, etc.) and the environmental, meteorological and/or climatic conditions during the historical journeys.

The historical information is obtained from telematics information (namely, telematics data) of the identified vehicle (obtained, for example, by one or more sensors installed on the identified vehicle, originating from one or more CAN communication networks, by means of a global positioning system (GPS), and/or by the combinations thereof and their known equivalents). The telematics information of the identified vehicle includes, without limitation, the following data elements:

- information originating from the engine speed of the identified vehicle (for example, adjustment of the transmission such as parking, driving, neutral point, position of the throttle valve, temperature of the cooling liquid, temperature of the intake air, barometric pressure, vehicle speed, manifold absolute pressure, oxygen sensor, coolant sensor);
- information originating from electrical sensors (for example, visual/audio systems, braking lights, indicator lights, headlights, hazard lights, reversing lights, parking lights, windscreen wipers, locked doors, key in the door contact/lock, skip actuated, battery voltage, fuel level, mileage, weight of the occupant, weight of the load);
- information originating from the state of the identified vehicle (for example, the speed of the identified vehicle, its location, the distance travelled, the relative distance of the identified vehicle relative to other vehicles and/or other objects);
- computed information (for example, the acceleration and/or deceleration of the identified vehicle, its lateral acceleration, the pressure loss of its tires); and
- identification of the driver (for example, by voice recognition, code, biometrics, retina, etc.).

The term "general information" (in the singular or the plural) is used herein to refer to data corresponding to the identified tire. This data can include, without limitation, its size (which can be represented by the type of tire and/or its nomenclature), its construction code (for example, "R" for radial), its production origin (for example, the name and/or the brand of the manufacturer of the identified tire, its date of manufacture and its place of manufacture, distribution and/or storage), its unique identification number (or "serial number"), its load index, its speed symbol (for example, "A5", which represents 25 km/h), and/or its scheduled mileage. By way of an example, for a tire with a size of 250/70 R 15, the number "250" represents the nominal cross-sectional width of the tire in millimeters, the number "70" represents the height:width ratio (or "aspect ratio") of the tire, the letter "R" represents a radial tire, and the number "15" represents the rim diameter in inches.

The general information can also include the mounting position (including the mounting history) of the identified tire. It is understood that the mounting position of an identified tire $P_{10}$ shown in FIG. 1 is provided by way of an example.

The general information can also include the retread rank (if applicable) of the identified tire. The term "retread" is used herein to refer to the method used to return a worn tire to a state fit for operation by renewing the rubber of the tread and the one or more plies. During the retreading process, old tread products are removed and replaced by new materials. Retreading is a method that is known and regulated in the industry. Data corresponding to the retreading level of an identified tire is managed by a manager of the identified vehicle and/or by the producer of the identified tire.

The server 102*a* can be associated with one or more transport vehicle managers 108, including, without limitation, one or more fleet companies to which the one or more identified vehicles belongs. In one embodiment of the invention, the historical information and/or the general information can be generated and/or managed, at least partly, by one or more sites serviced by one or more vehicles mounted with the identified tires (or by one or more networks of sites, including a specific site). In this embodiment, the system 100 can simulate destination sites for the identified tire based on the historical information. It is understood that the managers 108 manage their vehicles in different ways, and their management modes are therefore susceptible to modification. Thus, in this embodiment, the general information also can be used to specify the link between the historical information and the properties of the identified tire by making a personalized simulation with respect to the destination sites (for example, by Monte Carlo means).

The server 102*a* can include (or can access) a database 110 of the system 100 from which data incorporating the historical information 104 and the general information 106 is recorded to construct the remaining useful life (RUL) profile of the identified tire. This data includes the telematics information that corresponds to each visit of the identified vehicle to a scheduled location (for example, each visit of the truck 10 to a loading site for a transport container) (see FIG. 1). The data for each visit includes the information that specifies the state of the identified tire at the time of the visit, with this information including, without limitation, the date of the visit, the mileage of the identified tire on this date, the type of vehicle involved, the damage observed during the visit, etc. It is understood that a measurement of the tread depth can be included in this data to serve as a basis for validation, but this measurement is not critical for the completion of the method 200.

The data stored in the database 110 can include the data obtained by a location means mounted on the identified vehicle (for example, in the cab 10*a* of the truck 10). This data includes data that corresponds to each journey of the identified vehicle (for example, a journey made by the truck 10 between the loading site for the transport container and the filling site for the container). It is understood that a journey could include a one-way journey, one or more return journeys and variable journeys.

Furthermore, the server 102*a* can include (or can access) a database 112 including data stored in the database 110, including the telematics information, that is consolidated in order to establish at least one remaining useful life (RUL) profile of the identified tire. In order to create the remaining useful life (RUL) profile, this consolidation, which is performed by the one or more processors of the server 102*a*, consolidates a plurality of independent journeys. Thus, the database 112 incorporates the telematics information that is obtained together with the general information, which allows the manager 108 of the identified vehicle to include the (RUL) profile of an identified tire and to estimate the remaining mileage of this tire in order to prepare a maintenance plan.

The communication network 102 of the system 100 includes one or more communication devices (or "devices") 114 that capture the obtained data and transmit it to the server 102*a*. The one or more communication devices 114 include one or more portable devices such as a mobile network device 14*a* (for example, a mobile telephone, a laptop computer, one or more portable devices connected to the network, including devices of the "augmented reality", and/or "virtual reality" type, and/or any combinations and/or equivalents). In all cases, the communication devices can include clothing and/or portable devices connected to the network and carried by one or more operators (where each operator is a human, a known apparatus such as a robot and/or an autonomous vehicle). By way of an example, a monitoring device worn by a driver of the vehicle can video monitor the conditions of a journey and send the corresponding data (namely, the historical information of the identified tire) to the server 102*a* of the communication network 102.

The one or more communication devices 114 can also include one or more remote computers 114*b* capable of transferring data via the communication network 102. By way of an example, a portable device 114*a* of the system 100 can transmit the historical information and/or the general information of the identified tire $P_{10}$ to a remote computer 114*b* of the system 100. Based on the transmitted data, the remote computer 114*b* can transmit the maintenance report of the identified tire to the portable device 114*a*, indicating a scheduled maintenance (for example, a recommendation to withdraw the identified tire from service because a prediction model of the invention indicates that the remaining mileage is too low to complete the next cycle).

In embodiments of the system 100, the one or more communication devices 114 of the communication network 102 can also include one or more sensing devices 114*c* that capture and transmit data from the identified tire to the server 102*a*. The one or more communication devices 114*c* could be disposed in or on the identified vehicle (for example, in a cabin 10*a* of a truck 10) (see FIG. 1). In some embodiments, the one or more sensing devices 114*c* could include an imaging system (not shown) for capturing images and for transmitting the corresponding data to the server 102*a*. The imaging system can include at least one camera that captures images of the objects that enter the field of view of the one or more cameras during at least one journey that is made by the identified vehicle (for example, images of the ground, images of any debris throughout the journey, images of the condition of the journey, images of the identified tire during its use, etc.). These objects could be captured in the images together with influential parameters. The corresponding data is stored in the database 110 of the system 100 to facilitate the construction of a prediction model of the estimation method 200. This data is updated on a continuous basis or on an intermittent basis. In embodiments of the system 100 where a manager 108 of the identified vehicle generates and/or manages the historical information and/or the general information, this data (including the data corresponding to one or more images) can be generated, at least partly, by one or more communication devices 114.

The communication network 102 can include wired or wireless connections and can use any data transfer protocol that is known to a person skilled in the art. Examples of wireless connections can include, without limitation, radiofrequency (RF) connections, satellite connections, mobile telephone connections (analogue or digital), Bluetooth® connections, Wi-Fi connections, infrared connections, "ZigBee" connections, local-area-network (LAN) connections, wireless-local-area-network (WLAN) connections, wide-area-network (WAN) connections, near-field-communication (NFC) connections, connections using other wireless communication standards and configurations, their equivalents, and a combination of these elements.

It is understood that the communication network 102 (including the server 102*a*) implicates the use of one or more processors, as will be understood by a person skilled in the art. The term "processor" (or, alternatively, the term "programmable logic circuit") (in the singular or in the plural) refers to one or more devices capable of processing and analyzing data and including one or more software packages for processing them (for example, one or more integrated circuits known to a person skilled in the art as being included in a computer, one or more controllers, one or more microcontrollers, one or more microcomputers, one or more programmable logic controllers (or "PLCs"), one or more application-specific integrated circuits, one or more neural networks and/or one or more other known equivalent programmable circuits). The processor includes software for processing the data captured by the elements associated with the system 100 (and the corresponding obtained data), as well as software for identifying and locating variances and identifying the sources thereof in order to correct them.

The invention therefore benefits from methods and tools based on artificial intelligence (or "AI") in order to supplement the partial information that is provided (based on the historical information and the general information that is obtained). An analysis of the machine learning is performed using a machine learning model such as a Set Learning model. The machine learning analysis receives processed data from the communication network 102 as input, namely, the historical information 104 and the general information 106 of the identified tire. In some embodiments, data is obtained as input in various layers of the machine learning model. The algorithm allows continuous improvement across all the tires mounted in a fleet of vehicles, ensuring that the system 100 improves from the experience it acquires, notably in terms of the choice between a maintenance schedule and an inspection schedule for the identified tire.

Referring further to FIGS. 1 and 2, embodiments are disclosed of a method 200 for estimating RUL (or "estimation method" or "method") of the invention implemented by the system 100. In each embodiment, the estimation method 200 is computer-implemented (for example, by the server 102*a*), so that the system 100 can build the prediction model that estimates the remaining mileage of identified tires based on its predetermined removal mileage (called "predicted removal mileage").

As used herein, the term "method" or "process" can include one or more steps performed by at least one computer system including one or more processors for executing instructions that perform the steps. Any sequence of steps is provided by way of an example and does not limit the described methods to any particular sequence.

Throughout the following description, an identified vehicle that is associated with the identified tire is represented by a truck 10. The truck 10 includes a cab 10*a* at the front and a chassis 10*b* in the form of a flat body for connecting a known transport container (not shown).

The truck 10 is of the type that is well known in the trade for transporting products over long distances. However, it is clearly understood that the truck 10 is provided by way of an example and that the system 100 could be implemented with other types of vehicles mounted with one or more identified tires (for example, any vehicle that makes repeated journeys). The identified vehicle (for example, the truck 10) includes an acceleration detection means, which could be a known accelerometer (not shown). The accelerometer can be a triaxial accelerometer that is capable of measuring acceleration in the three spatial dimensions. The accelerometers can be micro-electromechanical sensors ("MEMS") that are widely available at a low price and that remain reliable throughout their operation. During operation, the accelerometer detects the vertical and horizontal shocks experienced by the identified vehicle on which it is mounted (for example, the vertical and horizontal accelerations produced when the vehicle moves over surfaces on an ascending or descending slope, as well as over rough surfaces). The accelerometer can be mounted anywhere on or in the identified vehicle to be able to detect the starting and stopping of the identified vehicle. For example, the accelerometer can be located under or in the cab 10*a* or on the chassis 10*b* of the truck 10 of FIG. 1. It is understood that the acceleration data also can be obtained from other varied sources, including, without limitation, one or more CAN communication networks, by means of a global positioning system (GPS), and/or by the combination thereof and their known equivalents.

Upon starting the estimation method 200 shown in FIG. 2, the method includes a step of performing a process of building a prediction model (or "model"). In order to build the prediction model, the process includes a step 202 of entering, to the system (100), influential parameters of the identified tire and telematics information obtained from the identified vehicle. During this step, influential parameters of the identified tire including data obtained by the communication devices 114 of the system 100 is transmitted to the server 102*a*. The influential parameters that are obtained include data corresponding to the historical information 104 and to the general information 106 of the identified vehicle. In order to train the prediction model, this data is stored (for example, in a database 110 of the system 100) (see FIG. 1), and it is updated throughout the duration of the method (either on a continuous or intermittent basis).

In one embodiment of the estimation method 200 of the invention, the prediction model can predict a number of remaining journeys of the identified tire (corresponding to its remaining mileage) in order to determine its remaining useful life. In this embodiment, the entering step 202 includes entering into the database 110 the telematics information corresponding to each visit of the identified vehicle.

In this embodiment of the method 200, the entering step 202 also includes entering the data into the database 110 that is obtained from a location means of the system mounted on or in the identified vehicle (for example, on or in the transport truck 10). The location means can detect the position of the identified vehicle using various techniques that are known in the art, including by means of a global positioning system (GPS), an inertial navigation system and/or other equivalent location means. The data obtained by the location means and stored in the database 110 includes data that corresponds to each journey of the identified vehicle (for example, a journey made by the transport truck 10 between the loading site 20 and the unloading site 30). It is understood that a journey could include a one-way journey, one or more return journeys or one or more variable journeys. The data obtained by the location means can be transmitted by the network 102 to the server 102*a* in order to consolidate and process this data. It is understood that the obtained data could also be stored in the database 112 in order to determine an operating state of the identified vehicle.

In this embodiment, the entering step 202 further includes a step of identifying a plurality of scheduled locations (for example, one or more vehicle management bases and/or one or more destinations frequented by the identified vehicle). Identification includes identifying coordinates of each scheduled location using historical GPS data obtained from influential parameters incorporating the telematics information.

In all the embodiments of the method 200 of the invention, the entering step 202 can include an optional step of creating a learning database (or "database") that is entered into the prediction model. The created learning database can include a reference database of the tires intended to be mounted to the identified vehicle. The database can include a previously created reference (for example, a table of the remaining useful life of tires with several miles to complete before they are removed). The database can include parameters corresponding to a plurality of commercially available tires (including parameters that form part of the aforementioned general information). The created database can include images of worn tires in known states of use and the corresponding number of completed journeys. Therefore, the learning database can include expected images (and therefore data) corresponding to the profiles (3D, 2D, 1D) of the worn tires and the journeys of the associated vehicles (including the number of miles covered during these journeys). The specific source is not essential for the method described herein.

The system 100 implements the method 200 of the invention to assist a manager 108 of the identified vehicle to transmit information relating to the progress of the use of the identified tire (and the corresponding mileage) to the personnel on a site serviced by the manager, such as during an inspection of the identified vehicle (for example, an inspection of the transport truck 10). The system 100 implements the estimation method 200 in order to prepare customized reminders to be sent to an operator of the identified vehicle (either the manager or a site serviced by the manager) in order to schedule the maintenance of the identified tires.

As used herein, "operator" (or "user" or "participant" or "subject") refers to a single operator or to a group of operators of one or more identified vehicles. An operator includes, without limitation, an individual operator of an identified vehicle (for example, a driver of the truck 10), an individual member of a team or of a group that manages a particular vehicle, a digital community associated with the management of a particular activity in which an identified vehicle participates, and combinations and equivalents thereof. The operator can be an observer physically or digitally assisting in a journey and/or a visit (for example, by remotely managing the identified vehicle). As used herein, an "operator" can also refer to one or more other individuals who analyse the data gathered in another environment under conditions similar to the environment of the identified vehicle (for example, a site with comparable operating conditions compared to the conditions experienced by the truck 10). As used herein, an "operator" can also refer to any electronic system or apparatus configured to receive a control input and configured to automatically send data to at least one other operator.

With further reference to FIGS. 1 and 2, the estimation method 200 of the invention further includes a step 204 of consolidating, by one or more processors of the server 102*a* of the system 100, the obtained influential parameters and the obtained telematics information in order to assemble a plurality of independent journeys in order to establish at least one remaining useful life (RUL) profile of the identified tire. By way of an example, a location means of the GPS type mounted on the identified vehicle provides the data that is required in order to obtain a correlation between the data stored in the database 110 and the data recorded in the database 112. With reference to the example of FIG. 3, the data obtained and accumulated at a scheduled point (shown at the points "Travel D", "Travel G" and "Travel H"), represent several journeys completed by an identified tire between two consecutive visits.

With further reference to FIGS. 1 and 2, the estimation method 200 of the invention further includes a step 206 of training the prediction model to predict the remaining useful life RUL corresponding to the attainment of the predicted mileage for removing the identified tire. As used herein, the "predicted mileage for removing" an identified tire refers to a scheduled maximum distance (for example, the remaining number of miles) before it is replaced. During this step, a machine learning method takes the obtained influential parameters as input (namely, the historical information 104 and the general information 106 of the identified tire), as well as the data from the created learning database. After the system 100 has obtained the historical information and the general information corresponding to the identified tire, the processor can retrieve the known remaining useful lives that correspond to the number of journeys made by the identified tire in order to build the prediction model.

In one embodiment where the training step 206 includes a supervised learning method, the supervised learning method that is used includes a supervised learning method of the Set Learning type (as discussed above). In one embodiment using a supervised learning method of the Set Learning type, the Set Learning method that is used could include, without limitation, one or more techniques of bagging (including Bagged Decision Trees and Random Forests), Boosting and/or Stacking type.

In one embodiment using a supervised learning method of the Set Learning type, the Random Forest technique is used to distinguish a non-linear boundary between the maximum mileages of the various tires. The Random Forest technique relates to a collection of independent decision trees in which each tree receives the same input sample and classifies it by propagating it downwards from the tree, from the root node to a leaf node. By presenting an initial untrained decision tree with numerous input and output matches, the parameters of its internal division functions will gradually change and will produce similar input and output matches. This learning process is made possible by defining an information gain criterion. The parameters that produce a maximum information gain can be recompensated (see *Random Forest*, by Leo Breiman, UC Berkeley (January 2001)).

Random Forest is a machine learning model capable of distinguishing between observations based on the characteristics of a displacement level. With reference to FIG. 4, the data corresponding to the mileage of a removed tire is shown for three (3) managers A, B, C as a function of the applicable axle (the rear axle, the trailer axle, the steering axle). Since most of the journeys are made by the identified vehicle for each manager, there is a dense group of observations in a predefined zone and the other observations are randomly selected from among the other vehicles incorporating a tire of the type mounted on the identified vehicle. Therefore, the Random Forest technique is used as a regression algorithm for the predictive maintenance of these vehicles, proposed as a machine learning-based approach for performing predictive maintenance.

In one embodiment of the method that uses the data obtained by a GPS type location means, the features with respect to the journey take the geolocation data and generate variables such as the average speed, the maximum speed, the standard deviation of the speed, the acceleration, etc. These features of the journey are entered into the prediction model so that it learns the signature of the identified tire and the use of the operator. In this embodiment, the estimation algorithm that is used requires GPS data over at least 1 Hz in order to obtain information relating to the time, the speed, the position and the altitude. Based on these values, other features, such as the lateral acceleration, the longitudinal acceleration, the slope of the road and the total distance, can be computed. All these features (GPS and computed), as well as their compiled statistics (average, median, standard deviation, etc.), are used to supply the prediction model in order to complete its training and its validation. The total distance travelled by the identified tire is also required to train and validate the prediction model, and this is what the deployed model predicts.

With this estimation algorithm, physical measurements are not necessary for estimating the removal of an identified tire due to its complete wear at the end of its life. It is understood that it is possible to use the tread pattern depth associated with each mileage to improve the accuracy of the algorithm that is used, if the data is available (but this element is not essential for implementing the method 200). Thus, the algorithm employed does not involve removing an identified tire due to damage, uneven wear (for example, of the central, shoulder and/or diagonal type), accidents or the robustness of the carcass. Furthermore, the algorithm that is used does not involve a change in position of the identified tire (for example, a change between axles and within the same axle after driving).

The system 100, by implementing the method 200, is therefore capable of automatically identifying the recurrent stoppages from GPS tracking, satellite images or a combination of these elements. The data originates from a wide set of actual vehicles normally operating with various operators.

The estimation method 200 of the invention further includes a step 208 of predicting, by the one or more processors of the server 102, the remaining useful life (RUL) of the identified tire before it reaches its predicted removal mileage. In one embodiment of the method 200, this step includes a step of predicting the number of journeys made in real time (corresponding to the remaining number of miles), wherein the prediction includes a prediction of a type of journey based on telematics information including historical geographical coordinates. In this embodiment, a Set Learning machine learning model is used to predict the remaining useful life (RUL) corresponding to the mileage for removing the identified tire.

The RUL of the identified tires (determined, for example, in terms of the number of miles or in other equivalent terms) can be computed from the data corresponding to the influential parameters of future cycles. It is understood that the data of future cycles can be hypothetical or real depending on the type of management applied by the manager 108 to their fleet of vehicles and their ability to know, within a given time frame, the routes that will be assigned to a vehicle.

In one embodiment, an offset between the actual remaining useful life and the scheduled number of miles is denoted by a computed error. The computed errors can be entered into the learning database (described above) to improve the predictive capacity of the prediction model.

The estimation method 200 of the invention further includes a comparison step 210, during which the lifetime RUL before reaching the predicted mileage for removing the identified tire, derived from the prediction model, is compared with a removal threshold value. This removal threshold is to be defined (for example, by the manager 108 and/or by the manufacturer of the identified tire) in order to organize the maintenance plan. The maintenance plan of the identified tire include a choice between a maintenance schedule 212 (in which the identified tire remains mounted on the identified vehicle) and an inspection schedule 214 (in which the identified tire is inspected with a view to ensuring that it is removed at the correct time, either for retreading it or for introducing it into the end-of-life circuit, including recycling). During the comparison step 210, the system 100 indicates a maintenance schedule 212 for the identified tire if the number of miles derived from the prediction model is higher than the removal threshold value defined for the identified tire. Similarly, the system 100 indicates an inspection schedule 214 for the identified tire if the number of miles derived from the prediction model is equal to or lower than this removal threshold value. In the event that the identified tire has reached, or is close to reaching, the removal threshold, the system 100 takes into account the remaining useful lives (RUL) of the obtained worn tires (obtained, for example, from RUL measurements taken on tires received by a factory after use). If the identified tire must be replaced by another tire of the same type, the prediction model is updated when replacing the worn tire with an identified tire with a tread that is considered to be new (see number 216 in FIG. 2). It is understood that replacing the identified tire can include either retreading or recycling (or another end-of-life treatment) of the identified tire. In all embodiments of the estimation method 200 of the invention, one or more steps can be carried out iteratively.

In all embodiments of the estimation method 200 of the invention, each method, in whole or in part, can be controlled on a network (for example, the network 102) by means of one or more devices connected to the network (for example, the devices 114 of the system 100), examples of which include, but are not limited to, one or more mobile telephones, one or more laptop computers and/or tablets, or one or more other devices connected to the network (including devices including augmented reality, virtual reality and mixed reality capabilities), one or more articles of clothing and/or jewellery connected to the network and able to be worn (including watches) and combinations and equivalents thereof. Any device connected to the network that can be worn can be used to store and save all the data corresponding to a cycle of an identified vehicle (for example, the transport truck 10). This data can be used in a monitoring mode by the same device connected to the network or by any other device connected to the network.

Estimating the remaining useful life (RUL) is advantageous because tire failure remains a more common issue than tire wear estimation. Therefore, a significant amount of data and resources are available to the public. Furthermore, the advantage of a model without tread depth measurement is that it reduces physical intervention, which has a positive impact in terms of operating time and operational cost. Therefore, the invention predicts the longevity (and therefore predicts the maintenance plan) of an identified tire using easily accessible data, allowing a reliable prediction model to be created. Even though human specialists exhibit flexibility when making decisions regarding the maintenance schedule or the inspection schedule of a tire, they are not capable of analyzing the large amounts of data required to make real-time decisions with a view to determining a maintenance operation for the identified vehicle.

In all embodiments of the system 100, the system 100 evolves over time in order to improve the algorithm and, consequently, to optimize the service life of the tires mounted on the transport vehicles. By way of an example, the truck 10 can be different from a truck 10' in terms of the producer of each truck, the relevant model, the production year, etc. The trucks 10 and 10' can be the same brand, the same model, the same weight, the same engine type, the same age, etc. In both scenarios, the truck 10' therefore "learns" from the truck 10. The truck 10' can, in addition to receiving the recommended operational adjustment values (corresponding to the mounted tires), monitor its performance capabilities as a function of the received data.

Thus, as the amount of received data increases with the number of vehicles that monitor and transmit their performance capabilities, the system 100 provides more relevant information for an identified vehicle.

The system 100 can include preprogrammed management information. For example, an adjustment of the estimation method 200 can be associated with the parameters of the typical physical environments in which the system 100 operates (for example, the parameters of the locations serviced by an identified vehicle). In some embodiments, the system 100 (and/or an installation incorporating the system 100) can receive voice commands or other audio data representing, for example, starting or stopping the capturing of data corresponding to the historical information and/or the general information of the identified tires, or starting or stopping the movement of the communication device. A request made to the system 100 can include a request for the current state of a cycle completed by an identified vehicle. A generated response can be represented audibly, visually, in a tactile manner (for example, using a haptic interface) and/or in a virtual and/or augmented manner. This response, together with the corresponding data, can be recorded in a neural network.

For all embodiments of the system 100, a monitoring system could be installed. At least part of the monitoring system can be provided in a portable device, such as a mobile network device (for example, a mobile telephone, a laptop computer, one or more portable devices connected to the network (including "augmented reality" and/or "virtual reality" devices, wearable clothing connected to the network and/or any combinations and/or any equivalents)). It is conceivable for the detection and comparison steps to be able to be performed iteratively.

The terms "at least one" and "one or more" are used interchangeably. The ranges that are presented as lying "between a and b" include the values "a" and "b".

Although particular embodiments of the disclosed apparatus have been illustrated and described, it will be understood that various changes, additions and modifications can be made without departing from the spirit or the scope of the present disclosure. Therefore, no limitation should be imposed on the scope of the invention described, apart from those disclosed in the appended claims.

The invention claimed is:

1. An estimation method implemented by a system using a computer for estimating a remaining useful life of an identified tire by aggregating influential parameters obtained from the identified tire and telematics information obtained from an identified vehicle having the identified tire mounted thereon, the method comprising:

- a step of building a prediction model comprising the following:
  - a step of entering influential parameters of the identified tire into the system comprising data obtained by one or more communication devices of the system and transmitted to a server of the system and comprising the telematics information obtained from the identified vehicle; and
  - a step of consolidating, by one or more processors of the system, the obtained influential parameters and the obtained telematics information to obtain consolidated parameters and information, of assemblinga plurality of independent journeys from the consolidated parameters and information, and of establishing at least one remaining useful life profile of the identified tire from the plurality of independent journeys;
- a step of training the prediction model that uses a consolidated output to establish a plurality of predictions corresponding to journeys taken by the identified vehicle having the identified tire mounted thereon and to estimate a number of journeys made by the identified tire, wherein a supervised learning model is used to predict the remaining useful life corresponding to a predicted mileage for removing the identified tire;

a step of predicting, by the one or more processors, the number of journeys made in real time, including predicting a type of journey based on the telematics information including historical geographical coordinates; and a comparison step, during which the remaining useful life before reaching the predicted mileage for removing the identified tire, derived from the prediction model, is compared with a defined removal threshold value corresponding to a predicted mileage for removing the identified tire, wherein the system creates a maintenance plan for the identified tire.

2. The method according to claim 1, further comprising a step of storing the influential parameters of the identified tire and the telematics information in a database of the system, wherein the influential parameters of the identified tire include:

historical information of the identified tire including data corresponding to historical journeys of the identified vehicle having the identified tire mounted thereon; and general information of the identified tire including data corresponding to the identified tire, including a mounting position of the identified tire on the identified vehicle.

3. The method according to claim 1, wherein the maintenance plan created by the system during the comparison step comprises:

a maintenance schedule, in which the identified tire remains mounted on the identified vehicle when a number of miles derived from the prediction model is greater than the defined removal threshold value for the identified tire; and an inspection schedule, in which the identified tire is inspected when the number of miles derived from the prediction model is equal to or less than the defined removal threshold value for the identified tire.

4. The method according to claim 1, wherein the step of entering influential parameters further comprises a step of entering telematics data originating from one or more communication networks into the system.

5. The method according to claim 1, wherein the step of entering influential parameters further comprises a step of entering telematics data originating from a location means of the system mounted on or in the identified vehicle into the system, with the step of entering telematics data comprising:

entering telematics information into the system that corresponds to each visit of the identified vehicle to a scheduled location; and entering telematics data obtained by the location means into the system that corresponds to each journey of the identified vehicle.

6. The method according to claim 5, wherein the location means comprises one or more global positioning systems.

7. The method according to claim 6, further comprising a step of identifying a plurality of scheduled locations including identifying coordinates of each scheduled location using historical global positioning system data obtained from the influential parameters incorporating the telematics information.

8. The method according to claim 5, wherein the identified vehicle comprises a truck with a cab at a front and a chassis in a form of a flat body for connecting a transport container.

9. The method according to claim 2, wherein the historical information or the general information is generated or managed, at least partly, by one or more managers of industrial vehicles, including one or more fleet companies to which the identified vehicle belongs or one or more producers, including mining producers.

10. The method according to claim 1, wherein the step of entering influential parameters comprises a step of creating a reference database for tires intended to be mounted on the identified vehicle.

11. The method according to claim 1, wherein the supervised learning model that is used to predict the remaining useful life during the step of training the prediction model includes a set learning method.

12. The method according to claim 11, wherein the set learning method includes using a Random Forest technique in order to distinguish a non-linear boundary between maximum mileages of various tires.

13. A system using a computer for implementing a method for estimating a remaining useful life of an identified tire by aggregating influential parameters obtained from the identified tire and telematics information obtained from an identified vehicle having the identified tire mounted thereon, the system comprising:

at least one memory configured to store an application for analyzing data representing a consolidation of a plurality of telematics data and the influential parameters, the consolidation providing a compilation of a plurality of independent journeys that establish at least one remaining useful life profile of the identified tire; and one or more communication servers each comprising at least one or more processors operationally connected to the at least one memory, with the one or more processors including a module for running the application for analyzing data that consolidates the influential parameters and the telematics information, wherein the at least one or more processors run programmed instructions stored in the memory to execute:

performing a process of building a prediction model comprising the following:

a step of entering influential parameters of the identified tire into the system comprising data obtained by one or more communication devices of the system and transmitted to a server of the system and comprising telematics information obtained from the identified vehicle; and a step of consolidating, by the at least one or more processors of the system, the obtained influential parameters and the obtained telematics information in order to compile a plurality of independent journeys in order to establish at least one remaining useful life profile of the identified tire;

training the prediction model that uses a consolidated output to establish a plurality of predictions corresponding to journeys made by the identified vehicle having the identified tire mounted thereon and to estimate a number of journeys to be made by the identified tire, wherein a supervised learning model is used to predict the remaining useful life corresponding to a predicted mileage for removing the identified tire;

predicting, by the one or more processors, the number of journeys made in real time, wherein the predicting includes predicting a type of journey based on the telematics information including historical geographical coordinates; and undertaking a comparison, during which the remaining useful life before reaching the predicted mileage for removing the identified tire, derived from the prediction model, is compared with a defined removal threshold value corresponding to a predicted mileage for removing the identified tire, wherein the system creates a maintenance plan for the identified tire.

14. The system according to claim 13, further comprising:

a communication network that manages the data entering the system, the communication network comprising:

at least one communication server with at least one processor that manages the data corresponding to the influential parameters of the identified tire; and one or more communication devices that obtain the data corresponding to the influential parameters of the identified tire and transmit the influential parameters of the identified tire to the server;

a database that stores the influential parameters of the identified tire, with the data including telematics information corresponding to each visit of the identified vehicle to a scheduled location; and a database storing data that is consolidated and constructing at least one remaining useful life profile of the identified tire from a plurality of journeys made by the identified vehicle having the identified tire mounted thereon.

15. The system according to claim 14, wherein the data stored in the database that stores the influential parameters of the identified tire includes data obtained from a location means mounted on or in the identified vehicle, with the data obtained from the location means comprising:

telematics information that corresponds to each visit of the identified vehicle to a scheduled location; and data obtained by a global positioning system that corresponds to each journey of the identified vehicle.

16. The system according to claim 13, wherein the server is associated with one or more transport vehicle managers.

17. The system according to claim 13, wherein the influential parameters of the identified tire include:

historical information of the identified tire including data corresponding to historical journeys of the identified vehicle having the identified tire mounted thereon; and general information of the identified tire, including a mounting position of the identified tire on the identified vehicle.

18. The system according to claim 13, wherein the supervised learning model that is used to predict the remaining useful life when training the prediction model includes a set learning method.

19. The system according to claim 18, wherein the set learning method includes using a Random Forest technique to distinguish a non-linear boundary between maximum mileages of various tires.

* * * * *